No. 887,366. PATENTED MAY 12, 1908.
C. A. WHIPPLE & G. W. FINCH.
HORSE COLLAR FASTENER.
APPLICATION FILED JUNE 27, 1906.
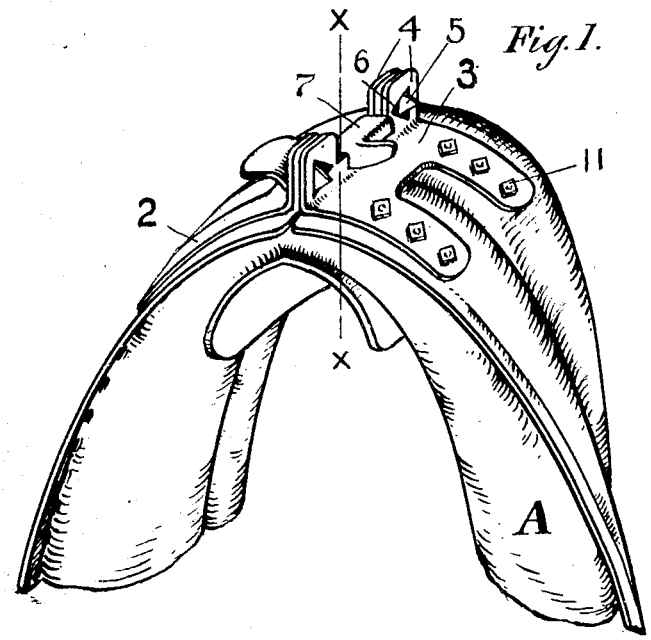
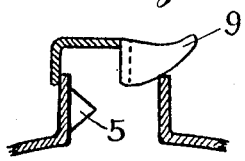
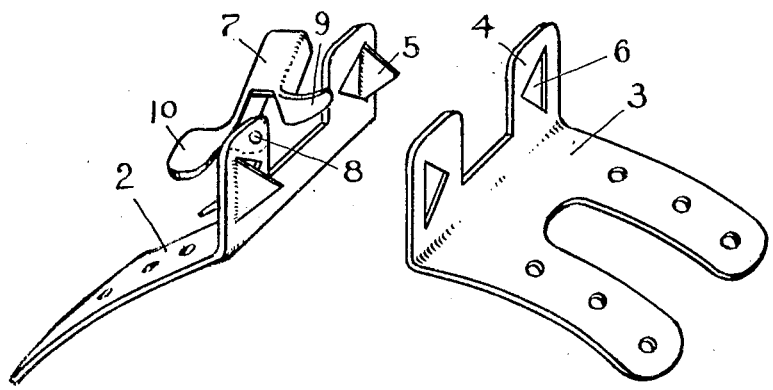
Witnesses,
George Voelker
A. J. Madden
Inventors,
Charles A. Whipple
George W. Finch
by Lothrop & Johnson
their Attorneys.

UNITED STATES PATENT OFFICE.

CHARLES A. WHIPPLE AND GEORGE W. FINCH, OF ELK RIVER, MINNESOTA.

HORSE-COLLAR FASTENER.

No. 887,366.  Specification of Letters Patent.  Patented May 12, 1908.

Application filed June 27, 1906. Serial No. 323,670.

*To all whom it may conncern:*

Be it known that we, CHARLES A. WHIPPLE and GEORGE W. FINCH, citizens of the United States, residing at Elk River, in the county of Sherburne and State of Minnesota, have invented certain new and useful Improvements in Horse-Collar Fasteners, of which the following is a specification.

Our invention relates to improvements in fasteners for the upper ends of horse collars, its object being particularly to provide an improved construction of fastener which will automatically lock when the ends of the horse collar are closed and which will also be especially easy of separation.

To this end our invention consists in the features of construction and combination hereinafter particularly described and claimed.

In the accompanying drawings forming part of this specification: Figure 1 is a perspective view of the upper ends of a horse collar fitted with our invention; Fig. 2 is a section of our invention taken on line $x$—$x$ of Fig. 1; and Fig. 3 is a perspective view of our invention.

In the drawings A represents a horse collar. Secured to the outer sides of the upper ends of the collar are plates 2 and 3, said plates being formed at their inner ends with upwardly extending flanges 4. The flange of the plate 2 carries guides 5 adapted to extend through opening 6 in the flange of the plate 3 when the collar ends are closed. The flanges are held together by a clamp 7 having hinge support 8 on one of the flanges, said clamp being bent at its inner end to fit over and receive the centers of both flanges.

In order to turn the clamp upward so that it will automatically drop into locking position when the collar ends are closed, we provide a lug 9 projecting laterally from the inner side of the clamp, so that when the collar ends are being closed, the inclined lower edge of the lug will engage with the upper edges of the flanges, raising the free end of the clamp until the flanges are brought close enough together by the closing of the collar to allow the clamp to drop into locking position. The clamp is also provided with an outwardly extending finger portion 10, by means of which it may be turned upon its pivot 8 to open position. The plates 2 and 3 are suitably secured to the collar as by means of bolts 11.

In operation, with the collar ends open, all that is necessary to do is to force the ends together when the lifting lug 9 will engage with the upper edges of the flanges, raising the clamp as illustrated in Fig. 2 and allowing the flanges to come together. As soon as the flanges come together, the clamp will drop into locking position. The guides 5 coöperate with the lifting lug to hold the members of the fastening device secured together. When it is desired to disconnect the device, the clamp may be raised by applying pressure to the finger extension 10.

We claim:

1. A horse collar fastening comprising a pair of members having upturned meeting flanges, a clamp pivotally supported on one flange, and being bent at its inner end to receive both said flanges, a finger portion 10 carried by the outer end of said clamp, a lug 9 extending at right angles from the inner side of said clamp adjacent to its flange receiving portion, the lower side of said lug being inclined upwardly toward its outer end to engage with and ride across the upper edge of the adjacent flange when said flanges are brought together, thereby lifting the bent upper end of said clamp above said flanges.

2. In combination with the ends of a horse collar, a fastening device consisting of a pair of members secured to said horse collar ends and provided with upwardly turned meeting flanges, a clamp pivotally supported upon one flange and being constructed to receive both said flanges, a lifting lug carried by the inner side of said clamp and extending at right angles therewith, the lower side of said lug extending upwardly toward the outer end thereof, and upwardly beveled guides carried by one flange in position to extend through openings in the opposite flange.

In testimony whereof we affix our signatures in presence of two witnesses.

CHARLES A. WHIPPLE.
GEORGE W. FINCH.

Witnesses:
FRANK L. SALTER,
CHAS. W. CARTER.